Patented Sept. 19, 1922.

1,429,272

UNITED STATES PATENT OFFICE.

FREDERICK M. BECKET, OF NIAGARA FALLS, NEW YORK.

METHOD OF PURIFYING TIN-BEARING FERROTUNGSTEN.

Application filed May 26, 1920. Serial No. 384,268.

*To all whom it may concern:*

Be it known that I, FREDERICK M. BECKET, a citizen of the United States, residing at Niagara Falls, in the county of Niagara and State of New York, have invented certain new and useful Improvements in Methods of Purifying Tin-Bearing Ferrotungsten, of which the following is a specification.
This invention is a method for the purification of tin-bearing ferrotungsten, such for example as ferrotungsten prepared from Chinese wolframite, which often contains sufficient tin to render the product practically worthless for many purposes.

I have discovered that a commercially complete elimination of the tin content of ferrotungsten resulting from the commercial reduction of such ores may be secured by treating the ferrotungsten, preliminarily ground or crushed to suitable size, with either sulfuric or hydrochloric acid. Of these solvents, hydrochloric acid affords the better extraction of tin, and is accordingly to be preferred when a nearly complete elimination of tin, say 85–95% of the total tin content, is required. Sulfuric acid is less costly however and may be used when a somewhat lesser extraction of tin (67–77%) will suffice.

In practice the ferrotungsten is ground to about 8 mesh or preferably finer, depending largely upon the concentration of acid used. For example either concentrated hydrochloric acid, or a mixture of 1 part by volume of the concentrated acid with 5 parts of water, will give a satisfactory extraction when the alloy is ground to 100 mesh or finer, whereas with the 8 mesh alloy, it appears essential to employ the more concentrated acid in order to obtain the optimum extraction.

In order to extract the tin it is sufficient to charge the comminuted alloy with the acid into a rotary wooden barrel, and to maintain the charge under slow movement for about 2 hours at a temperature of 55–63° C.; or for a correspondingly longer time at a lower temperature, say for instance about 24 hours at 25° C.

In the case of a ferrotungsten prepared as above and containing 0.6% of tin, it was found possible under proper operating conditions to extract 80–90% of the total tin content of the alloy, with a loss of tungsten not exceeding 2 to 3% of the total tungsten content. The tin content of the treated alloy varied from 0.03 to 0.06%, which is sufficiently low to satisfy most commercial requirements.

I claim:—

1. Method of purifying tin-bearing ferrotungsten, which consists in reacting on the comminuted alloy with an acid solvent for tin.

2. Method of purifying tin-bearing ferrotungsten, which consists in reacting on the comminuted alloy with an aqueous solution of hydrochloric acid.

In testimony whereof, I affix my signature.

FREDERICK M. BECKET.